(12) United States Patent
Graf et al.

(10) Patent No.: US 8,245,376 B2
(45) Date of Patent: Aug. 21, 2012

(54) DECONTAMINATING MACHINE SUPPORTS

(75) Inventors: Patrik Graf, Domat/Ems (CH); Andreas Janutin, Chur (CH); Peter Dubler, Zlzera (CH); Joos Luck, Furna (CH)

(73) Assignee: TRUMPF Gruesch AG, Gruesch (CH)

( * ) Notice: Subject to any disclaimer, the term of this patent is extended or adjusted under 35 U.S.C. 154(b) by 1805 days.

(21) Appl. No.: 11/250,157

(22) Filed: Oct. 13, 2005

(65) Prior Publication Data

US 2006/0075593 A1 Apr. 13, 2006

(30) Foreign Application Priority Data

Oct. 13, 2004 (DE) .................. 20 2004 015 922 U (51) Int. Cl.
*B21B 45/04* (2006.01)
*B21C 43/00* (2006.01)
*B23K 7/00* (2006.01)

(52) U.S. Cl. ............... 29/81.05; 29/81.11; 29/81.17; 15/236.1; 15/55; 15/88.4; 450/190; 450/439

(58) Field of Classification Search ........... 29/81.05, 29/81.11, 81.17, 81.13, 270, 278; 15/236.1, 15/236.08, 256.5, 236.06, 22.1, 22.2, 23, 15/27, 28, 55, 77, 88.2, 88.4, 93.4, 236.05; 451/130, 132, 190, 194, 439, 547

See application file for complete search history.

(56) References Cited

U.S. PATENT DOCUMENTS

| 1,984,762 | A | * | 12/1934 | Roberts | 29/81.05 |
|---|---|---|---|---|---|
| 2,317,495 | A | * | 4/1943 | Thompson et al. | 29/81.08 |
| 2,404,025 | A | * | 7/1946 | Barnes | 76/86 |
| 2,696,624 | A | * | 12/1954 | Normandeau et al. | 15/39 |
| 3,052,068 | A | * | 9/1962 | Burgess | 451/124 |
| 3,473,181 | A | * | 10/1969 | Leonard | 15/77 |
| 3,616,505 | A | * | 11/1971 | Klockner | 29/81.05 |
| 3,621,505 | A | * | 11/1971 | Vocker et al. | 15/23 |
| 3,739,415 | A | * | 6/1973 | Larson | 15/23 |
| 4,262,452 | A | * | 4/1981 | Lopez | 451/63 |
| 4,523,361 | A | * | 6/1985 | Dummermuth | 29/81.05 |
| 4,606,152 | A | * | 8/1986 | Michihara et al. | 451/55 |
| 5,263,221 | A | * | 11/1993 | Teichelman | 15/236.1 |
| 5,993,301 | A | * | 11/1999 | Kim et al. | 451/190 |
| 6,127,648 | A | | 10/2000 | Scott | |
| 6,321,431 | B1 | * | 11/2001 | Ziemek | 29/81.12 |

FOREIGN PATENT DOCUMENTS

DE 26 34 820 2/1977

(Continued)

OTHER PUBLICATIONS

English Machine Translation of WO 2005/077552 A1.*

(Continued)

*Primary Examiner* — Jermie E Cozart
*Assistant Examiner* — Christopher Koehler
(74) *Attorney, Agent, or Firm* — Fish & Richardson P.C.

(57) ABSTRACT

A device for cleaning supporting strips of workpiece supports includes a motor feed drive assembly having a feed drive motor and a feed member. The feed member is configured to engage the supporting strip and to be driven by the feed drive motor to provide relative motion between the feed member and the supporting strip along a longitudinal direction of the supporting strip.

20 Claims, 5 Drawing Sheets

FOREIGN PATENT DOCUMENTS

| | | |
|---|---|---|
| DE | 39 39 489 | 6/1991 |
| DE | 29717277 | 4/1998 |
| JP | 61-22277 | 8/1986 |
| WO | WO 2004/043638 | 5/2004 |
| WO | WO2005077552 | 8/2005 |

OTHER PUBLICATIONS

European Office Action from corresponding European Patent Application No. 05 020 654.9, mailed Jun. 16, 2009, 4 pages (the Action refers to WO2005077552 and cites p. 1, lines 1-20 and p. 6, lines 21-24 as being of relevance).

Office Action from the European Patent Office for corresponding European Application No. 05 020 654.9, mailed Jun. 21, 2010, with English translation, 10 pages.

Office Action from the Japanese Patent Office for corresponding Japanese Application No. 2005-299305, mailed Jul. 7, 2010, with English translation, 14 pages.

* cited by examiner

DECONTAMINATING MACHINE SUPPORTS

CROSS-REFERENCE TO RELATED APPLICATIONS

This application claims priority to German utility model application DE 20 2004 015 922.8, filed on Oct. 13, 2004, the entire contents of which are hereby incorporated by reference.

TECHNICAL FIELD

The application relates to a device for decontaminating machine supports and, in particular, to cleaning supporting strips of machines for the thermal cutting of workpieces.

BACKGROUND

A device for cleaning workpiece supports is described, for example in WO 2004/043638 A1. The described device for removing contamination requires manual advancement along the supporting strip. In the case of machines used for thermal cutting process, metal that has been melted by a laser cutting beam, for example, can flow down onto the workpiece support. Slag deposits can form on portions of the supporting strips, and as a result, the workpiece may no longer be evenly supported on the supporting strips.

SUMMARY

According to one general aspect, a device includes a motor feed drive and a feed member that is applied to the supporting strip to be cleaned in order to produce the feed motion. At least a substantial proportion of the feed force is not applied by the operator of the device, therefore, but rather is applied by the motor feed drive. To produce the feed motion, the feed drive makes use of the supporting strip that is to be cleaned. The feed drive itself may consequently be constructed using relatively few components. Compared with devices that have to be moved manually, owing to a separate and dedicated feed drive, there is at most a slight increase in the overall size and the weight of the device of this aspect as a whole, with improved handling for the operator.

In some embodiments, at least one feed member revolves in the driven state in a plane extending in the longitudinal direction of the associated supporting strip. Such a construction of the device is distinguished especially by its compactness.

In some embodiments, at least one feed member can be applied to a longitudinal side of the supporting strip. That measure is especially useful in view of the fact that supporting strips of the kind to be cleaned are usually relatively thin and therefore have at their upper and lower sides only relatively small surfaces that can be used for contact. In addition, the upper side of supporting strips is generally provided with projections on which the workpiece that is to be supported is supported in point contact. Application of feed members of feed drives to such uneven surfaces could be achieved at most with relatively high expenditure on construction. In contrast, when a feed member is in contact with a longitudinal side of the supporting strip, a relatively large and, apart from adherent contamination, substantially even surface used as an abutment, for example.

In some embodiments, at least one feed member is in the form of a roller that can be applied by its circumferential surface to the supporting strip and which has a rotation axis extending in the transverse direction of the supporting strip.

At least one opposite support can be associated with a feed member of the feed drive on the opposite side of the supporting strip. Acting together, the feed member and the opposite support cause the device to be guided in the longitudinal direction of the supporting strip. That automatic guiding also relieves the burden on the operator of the device.

In one embodiment, at least one feed member and the associated opposite support are adjustable relative to each other, thereby altering the width of the gap between them. This adjustment capability allows adaptation of the device to varying thicknesses of the supporting strips that are to be cleaned.

In another embodiment, at least one feed member and/or the associated opposite support can be applied to the supporting strip under the action of a resilient force. By virtue of that resilient support, the feed members and/or the opposite supports are able to deviate around any unevenness on the supporting strip that is to be cleaned. The feed motion is consequently not impeded or, at least, not significantly impeded by such unevenness.

In a further embodiment, at least one opposite support is rotatable about a rotation axis extending parallel to the rotation axis of an associated feed member.

During the feed motion, therefore, the opposite supports are able to roll over the supporting strip. Compared with fixed mounting of the opposite supports, the friction that has to be overcome during feed is reduced considerably.

In another embodiment, at least one of the opposite support also are in the form of a feed member. The feed members thus assume a double function. Owing to the arrangement of feed members on two opposite sides of the supporting strip in question, a uniform feed motion is obtained.

In some embodiments, a plurality of feed members are disposed one behind another in the longitudinal direction of the supporting strip and are associated with one and the same side of the supporting strip, likewise serves to optimize the feed motion. In particular, it is also possible to induce relatively high feed forces.

In some embodiments, at least one cleaning member, when in operation on a supporting strip to be cleaned, is biased toward the same. By virtue of that biasing, the desired cleaning effect, in particular, is achieved. The biasable cleaning members may be of a wide variety of types. Suitable types are, for example, brush elements, scrapers or cleaning rollers.

In another embodiment, at least one feed member and/or at least one opposite support forms at the same time a cleaning member. The functions "cleaning of supporting strips" and "feed drive" and, as the case may be, "guiding of the feed motion" can be implemented using one and the same component. An especially compact construction of the device is the result, in one embodiment.

In another embodiment, feed members associated with one and the same side of the supporting strip and disposed one behind another in the longitudinal direction thereof each form a leaning member. Especially effective removal of contamination is thereby ensured.

If feed and cleaning members disposed one behind another in the longitudinal direction of the supporting strip are of differing construction on the portion thereof that can be applied to the supporting strip, it is possible, in particular, to optimize the cleaning effect. For example, leading feed and cleaning members may perform coarse cleaning whereas trailing feed and cleaning members undertake the removal of fine contamination.

In another embodiment, at least one the feed member, opposite support and cleaning member has at least one protrusion on the side toward the supporting strip. Such protrusions may, on the one hand, be used move to remove contamination. On the other hand, such protrusions provide for a feed drive that is to a very great extent free from slip. The protrusions can be substantially vertical strips or substantially helical strips extending along of at least one of the feed members, opposite support, and cleaning members.

Strip-like protrusions that extend along the associated side of the supporting strip and in the transverse direction of the supporting strip are preferred.

In various embodiments, provisions are made are to guide the device during the feed motion. The guide handles on each side of a base body of the device moving in the feed direction can be configured to be easily handed over from one operator to another. The guide arrangement can be provided such that the supporting strips are usually mounted on a supporting structure that in turn comprises supports extending in the transverse direction of the supporting strips. The guide arrangement prevents collisions between such supports and the device as it moves in the feed direction along a supporting strip to be cleaned.

The guide arrangement can also include at least one guide plate which extends along a longitudinal side of the supporting strip and has a guide face at an end disposed in the longitudinal direction of the supporting strip.

In some embodiments to promote unrestricted operation of the device, the device includes overload protection, such as safety clutch, for example, provided in the drive train of the device between the feed drive motor and at least one feed member. In the event of the feed motion being blocked, such an overload protection reduces or prevents any damage to the components of the feed drive that might otherwise occur.

Other features will be apparent from the description, the drawings and the claims.

DETAILED DESCRIPTION

Figure 1:
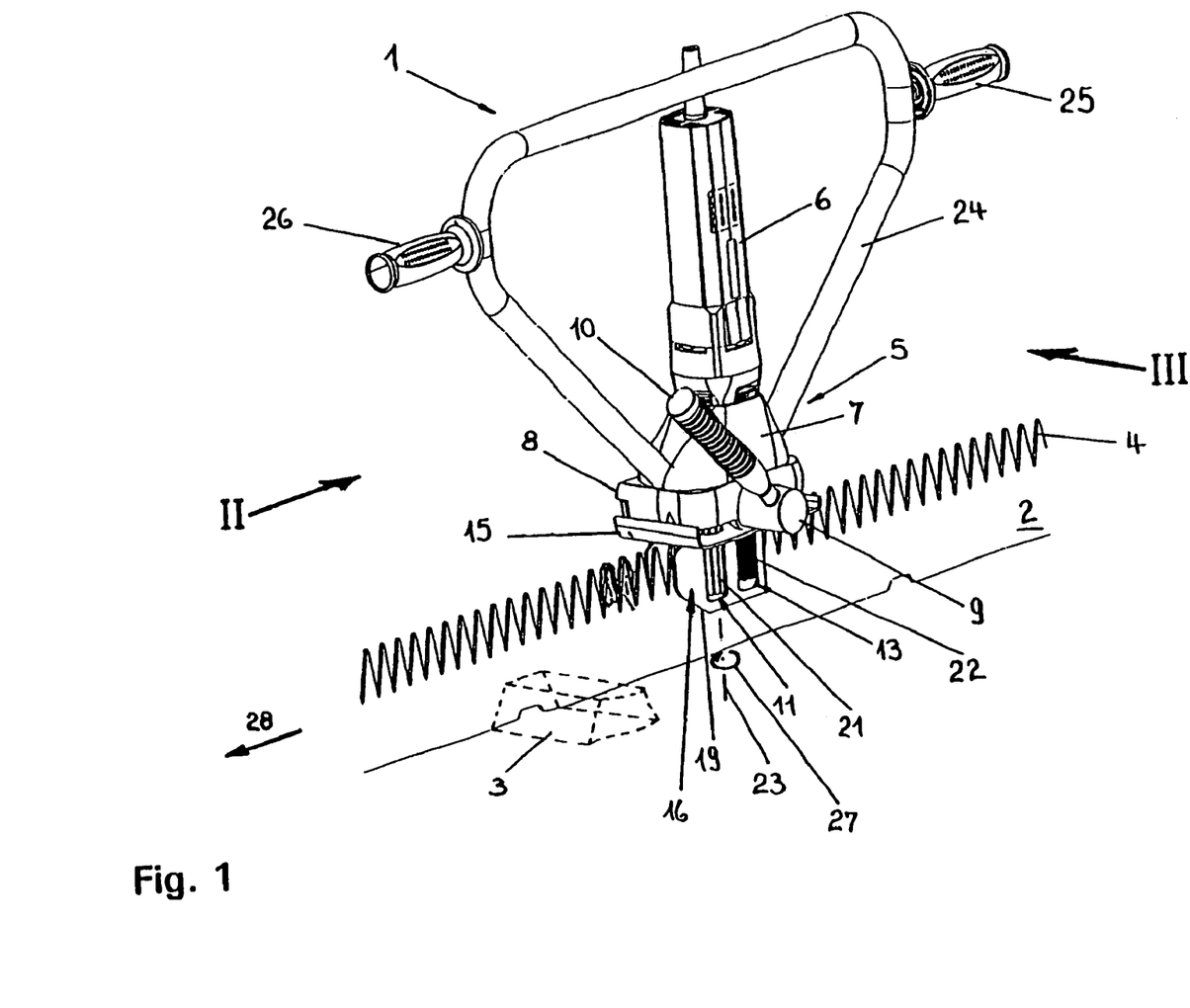
FIG. 1 shows a perspective view of a device for cleaning workpiece supporting strips in use on a workpiece supporting strip of a laser cutting machine.
Figure 2:
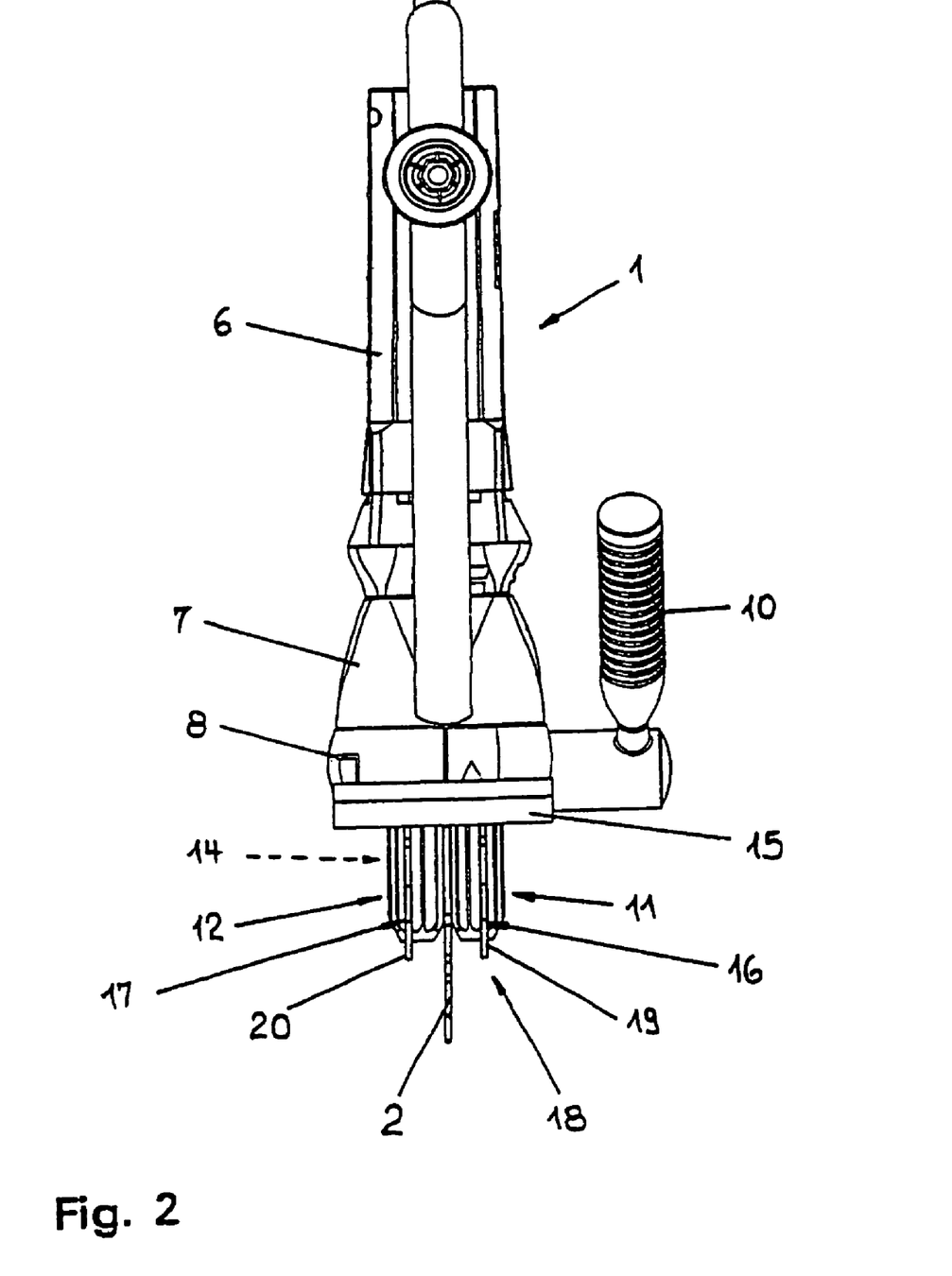
FIG. 2 shows the device according to FIG. 1 in plan view in the direction of the arrow II in FIG. 1.

As shown in FIGS. 1 and 2, a device 1 is employed for cleaning a supporting strip 2 of a machining apparatus for supporting workpieces. A plurality of supporting strips 2 arranged side by side form a workpiece support. The supporting strips 2 rest in turn on a support structure having cross-members 3 (shown in outline in FIG. 1) extending in the transverse direction of the supporting strips 2. On an upper side, each supporting strip 2 is provided with tooth-like points 4 which form point-type supports for the workpiece.

As a consequence of workpiece machining, contaminants which interfere with the functioning of the workpiece support are deposited on the supporting strips 2, especially on the points 4 thereof.

The supporting strip 2 shown, by way of example, forms part of the workpiece support on a laser cutting machine for machining sheet metal. During the a thermal cutting process, for example, metal that has been melted by a laser cutting beam can flow down out of the cut and onto the workpiece support. Slag deposits form on the points 4 of the supporting strips 2, as shown in FIG. 1 on two points 4 of the supporting strips 2. Removal of those slag deposits permits even support of the workpiece on the supporting strips 2.

For that purpose, the device 1 can be used on the supporting strips 2 throughout breaks in the machining of the workpiece, while the supporting strips 2 remain in their installed position. Alternatively, there is the possibility of replacing contaminated supporting strips 2 with supporting strips 2 that are substantially free of contamination and of cleaning the contaminated supporting strips 2 away from the machining apparatus.

The device 1 includes a base body 5 with an electric drive motor 6, a gear housing 7 and a switch housing 8. An operating shaft 9 projects laterally from the switch housing 8 and is provided with a switch lever 10.

Rollers 11, 12, 13, 14 project downwardly out of the switch housing 8. The roller 14 is concealed in the drawings. It is of identical construction to the roller 13 and lies opposite it.

All of the rollers 11, 12, 13, 14 extend through corresponding openings in a guide support 15 which is in turn fastened to the switch housing 8 and bent upward like a skid at both longitudinal ends. Guide plates 16, 17 welded to the guide support 15 are disposed on the underside thereof and form a guide arrangement 18, provided at one of their ends with a chamfered guide face 19, 20. The rollers 11, 12, 13, 14 lie inside window-like openings in the guide plates 16, 17. The rollers 11, 12 are provided at their circumferential surface with strips 21 which extend in the axial direction of the rollers 11, 12 and have a relatively great width in the circumferential direction of the rollers. Between the strips 21, gaps are provided in the circumferential direction of the rollers 11, 12. The rollers 13, 14 have strips 22 which similarly extend in the axial direction of the rollers but which have a considerably smaller width than that of the strips 21 on the rollers 11, 12. All of the rollers 11, 12, 13, 14 are conical at the ends thereof remote from the base body 5 of the device 1. A rotation axis 23 is shown in FIG. 1 for the roller 11. The rollers 12, 13, 14 have rotation axes 23 extending parallel thereto.

Joined to the gear housing 7 at the upper side of the switch housing 8 there is a guide frame 24 which projects to a great degree in the longitudinal direction of the supporting strip 2. The guide frame 24 is provided with guide handles 25, 26 at opposite ends.

At the beginning of the cleaning operation, the device 1 has to be brought from the open state into the closed state. The switch lever 10 is brought from the pivoted position shown by broken lines in FIG. 3 into the position shown by unbroken lines in FIG. 3. The concomitant rotational movement of the operating shaft 9 is translated via an adjusting mechanism known to one of ordinary skill in the area of machine design and construction, into mutually opposed movements of the rollers 11, 13 on the one side and of the rollers 12, 14 on the other side. As a result, the width of the gap between the rollers 11, 13 on the one side and the rollers 12, 14 on the other side is reduced from a relatively large value in the open state of the device 1 to a relatively small value in the closed state of the device 1. The distance of the rollers 11, 13 on the one side from the rollers 12, 14 on the other side in the closed state of the device 1 is slightly smaller than the thickness of the supporting strip 2 to be cleaned.

In the closed state, the device 1 is placed at an angle from above onto the supporting strip 2 that is to be cleaned. That application of the device 1 is facilitated by the conical ends of the rollers 11, 12, 13, 14. The electric drive motor 6 is still switched off initially.

Once the device 1 has been suitably applied to the supporting strip motor 2, the drive electric 6 is switched on. It then drives the rollers 11, 13 on the one longitudinal side of the supporting strip 2, in the direction of an arrow 27 shown in FIG. 1, about the rotation axes 23. The rollers 12, 14 on the opposite longitudinal side of the supporting strip 2 are driven by the drive motor 6 counter to that direction. The rollers 11, 12, 13, 14 roll over the supporting strip 2 and thereby draw the supporting strip 2 into the gap which is provided between them. The device 1 applied to the supporting strip 2 at an angle consequently moves along an inclined path in the direction toward the points 4 of the supporting strip 2. In the process, the device 1 comes to rest with the underside of the guide support 15 on the points 4 of the supporting strip 2. By the interaction of the guide support 15, on the one hand, and of the points 4 of the supporting strip 2, on the other hand, starting from its initial inclined position, the device 1 is aligned vertically with the machine axis.

As the supporting strip 2 is drawn in, the width of the gap between the rollers 11, 13 on the one side and the rollers 12, 14 on the other side increases, starting from the initial minimum size, to the thickness of the possibly contaminated supporting strip 2. The relative movement of the roller pairs arranged on each side of the supporting strip 2, which is required for that purpose, is executed counter to the action of the resilient force produced by means of cup springs. Owing to the resulting resilient restoring force, the rollers 11, 13 finally rest against the one longitudinal side and the rollers 12, 14 against the other longitudinal side of the supporting strip 2 under bias.

Driven by the electric drive motor 6, the rollers 11, 12, 13, 14 roll over the supporting strips 2 and thereby move the device 1 along the supporting strip 2 in the longitudinal direction of the supporting strip 2, more specifically in a feed direction 28.

The rollers 11, 12, 13, 14 act in the instance both as feed members and as cleaning members. In their capacity as cleaning members they remove contaminants present on the supporting strip 2. For example, the slag deposits indicated in FIG. 1 are ground off. The material removed is led away under the effect of gravity via the gaps between the strips 21 on the rollers 11, 12 and via the gaps between the strips 22 on the rollers, 13, 14. By means of the rollers 11, 12, it is possible to remove, the particular, coarse contaminants; the rollers 13, 14 remove the finer contaminants remaining after cleaning by the rollers 11, 12. The drive motor 6 both serves as a feed drive motor and serves for driving the cleaning operation.

If points 4 of the supporting strip 2 have bent sideways from their original vertical position, for example, as a result of unintentional lateral loads when workpieces are being placed on the workpiece support, the rollers 11, 12, 13, 14, rolling over the supporting strip 2 are able to bend those points 4 back into their vertical original position.

To be guided in the feed direction 28, the device 1 is held by the operator at one of the guide handles 25, 26, guide handle 25, for example, which is behind the feed motion. In one embodiment, in the case of cleaning supporting strips 2 that remain in their installed position, the device 1 may be handed over from one operator to another during its movement along a supporting strip 2. The device 1 can be taken by the handle 26 by an operator standing on the side of the relevant workpiece support which is opposite the starting movement point of the device 1. Since the guide frame 24 projects in the direction of the axis of the feed motion of the device 1 to a relatively great extent, the device 1 can be used under manual guidance even on relatively long supporting strips 2. The reach of two operators on opposite sides of the relevant workpiece support is increased to the required extent by the guide frame 24.

The guide support 15 and also the rollers 11, 12, 13, 14 serve on the device 1 to assist manual guidance. Owing to its skid-like bent-up portions, the guide support 15 slides over the points 4 of the supporting strip 2 without becoming caught on the points 4 or on contamination adhering to the latter. In addition, the guide support 15 is of such a width that it can be supported not only on the supporting strip 2 that is to be cleaned, but also on an adjacent supporting strip 2. The rollers 11, 12, 13, 14 guide the device 1 laterally. The roller pair arranged on the one side of the supporting strip 2 forms an opposite surface for the roller pair on the respective opposite side of the supporting strip 2.

In one embodiment, the rollers are operated with rotation axes 23 that are inclined to the vertical in the feed direction 28, they draw the device 1 with the underside of the guide support 15 toward the points 4 of the supporting strip 2. Undesirable lifting of the device 1 from the supporting strip 2 can thereby be automatically avoided. The same effect is achieved if, when in contact with the supporting strip 2, the strips 21, 22 on the rollers are not vertical but are similarly included forward toward the feed direction 28. Such an inclination is obtained, for example, when the strips 21, 22 extend in a substantially helical manner.

The guide arrangement 18 also serves the purpose of guiding the device 1 during the feed motion. If supporting strips 2 are being cleaned in their installed position, the guide arrangement 18 prevents collisions between the rollers 11, 12, 13, 14 and unexpectedly high cross-members 3 of the workpiece support. In such cases, the guide plates 16, 17 run by their guide faces 19, 20 onto the relevant cross-members 3 and guide the device 1 over the cross-members 3 as the feed motion continues.

By virtue of their being resiliently supported in the transverse direction of the supporting strip 2, the rollers 11, 12, 13, 14 are able to deviate to a certain extent around any unevenness that cannot be removed on the longitudinal sides of a supporting strip 2. If such deviation is not possible and if the feed motion of the device 1 is accordingly blocked, a safety clutch provided in the drive train of the device 1 between the electric drive motor 6 and the rollers 11, 12, 13, 14 ensures that the components of the feed drive are not damaged.

Figure 3:
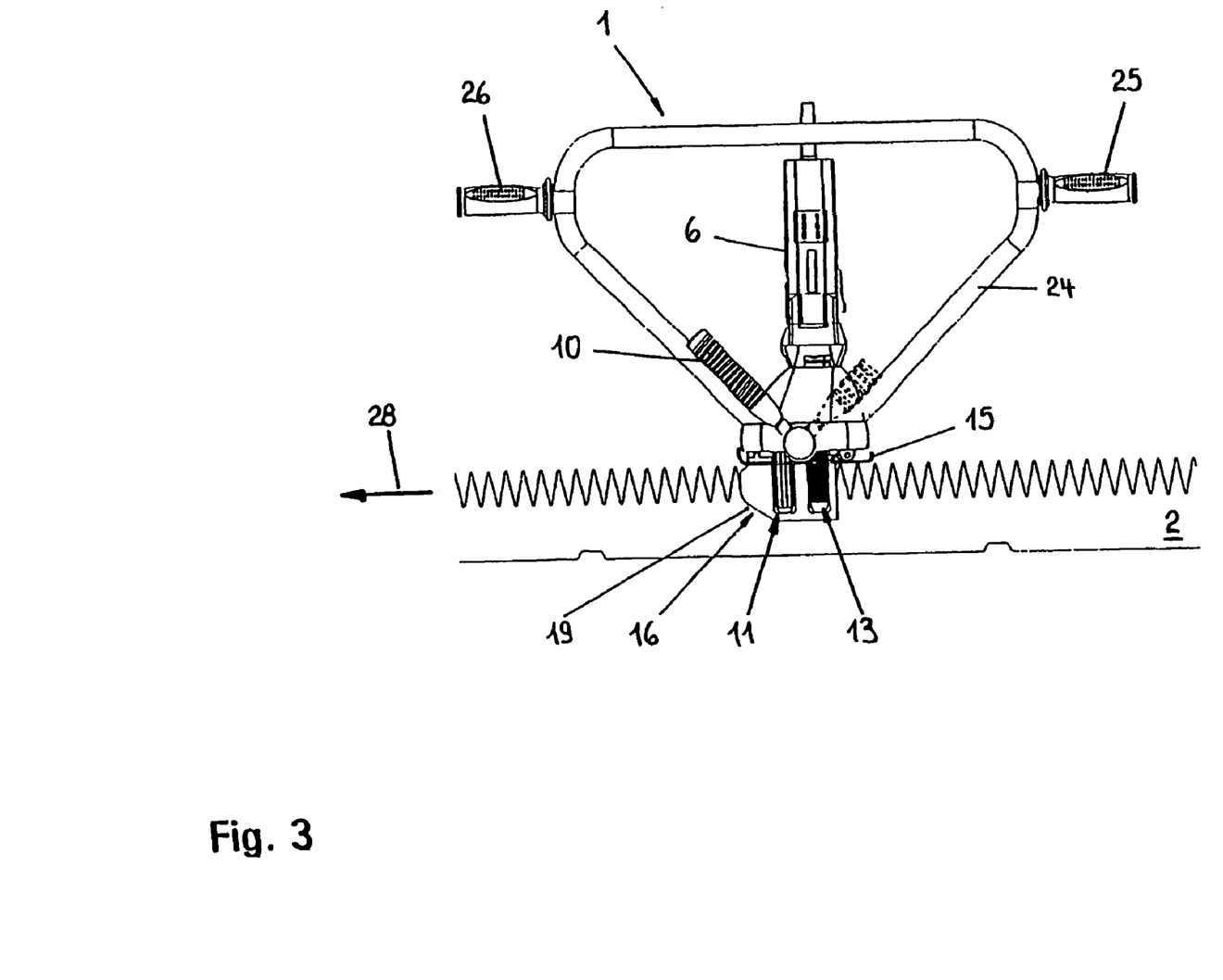
FIG. 3 shows the device according to FIGS. 1 and 2 in plan view in the direction of the arrow III in FIG. 1.
Figure 4:
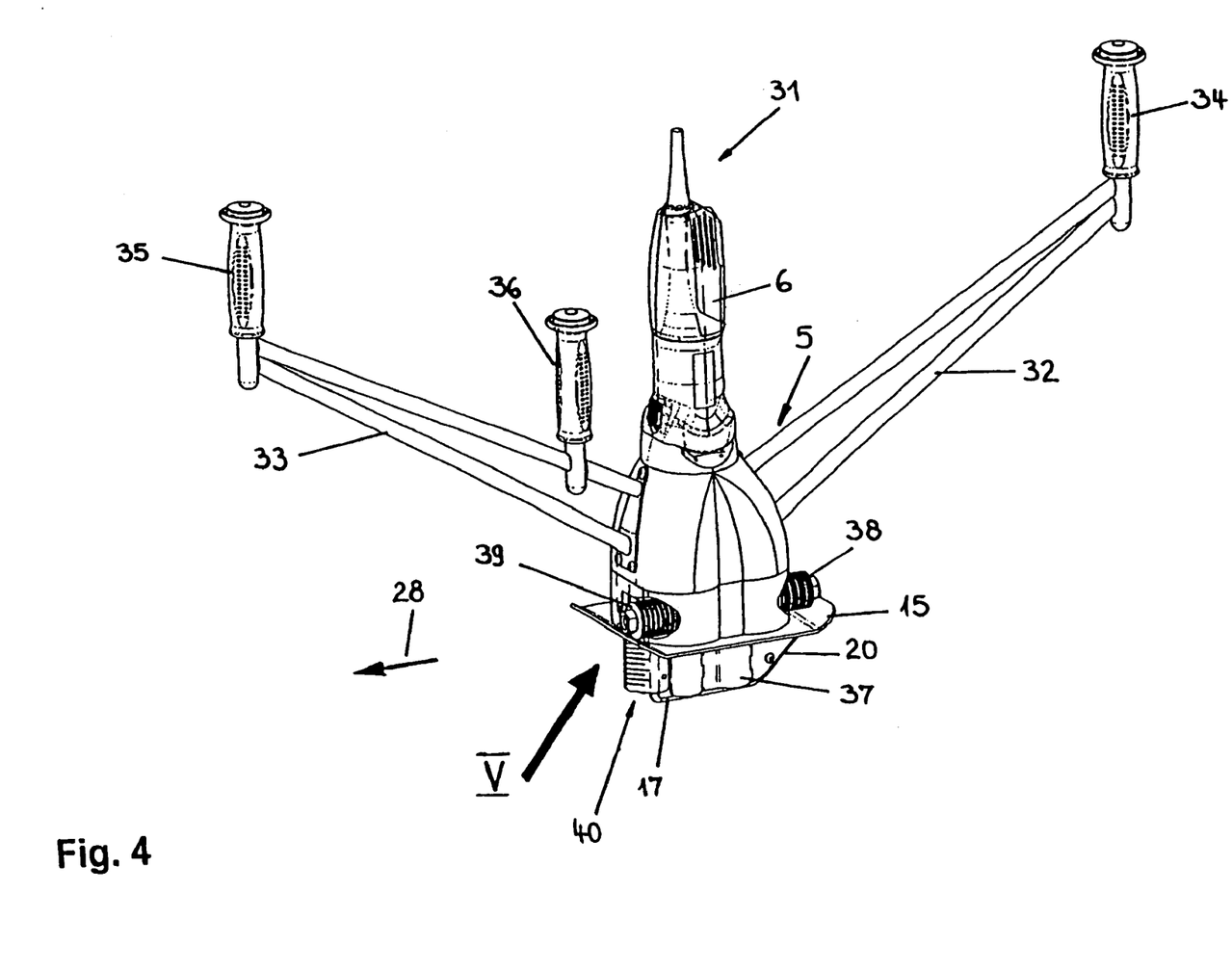
FIG. 4 shows a perspective view of a device for cleaning workpiece supporting strips.
Figure 5:
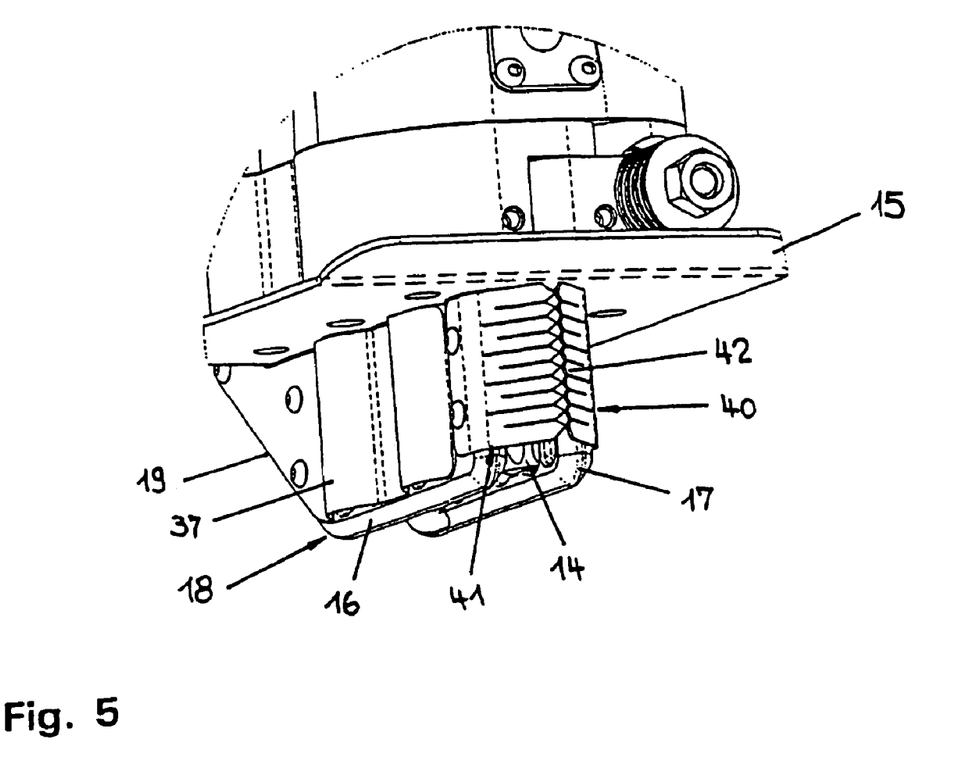
FIG. 5 shows the arrangement according to FIG. 4 viewed in the direction of the arrow V in FIG. 4.

Referring to FIGS. 4 and 5, a device 31 for cleaning supporting strips largely corresponds in construction and operation to the device 1 shown in FIGS. 1 to 3. The device 31 does not have a guide frame, but instead includes a laterally projecting guide arms 32, 33 with guide handles 34, 35 provided thereon. In addition, a turning handle 36 is provided on the guide arm 33, close to the base body 5 of the device 31. The turning handle 36 makes it easier to handle the device 31 when its direction of movement is being reversed. If, for example, a supporting strip in its installed position on a workpiece support has been cleaned along its entire length, before the device 31 is applied to an adjacent supporting strip it has to be turned through 180°. The turning handle 36 offers the operator of the device 31 a handle that can easily be reached by him for that operation.

Device 31 includes no switch lever for altering the width of the gap between the roller pairs that are associated with opposite sides of the supporting strip to be cleaned. Such rollers are to a very great extent concealed in FIGS. 4 and 5. The rollers 11, 13 on the one side and the rollers 12, 14 on the other side are covered on the device 31 by a respective cover plate 37 and therefore can be seen only partially in the drawings. On the device 31 also, the rollers 11, 13; 12, 14 can be displaced parallel to themselves and counter to the action of a resilient restoring force in the transverse direction of the supporting strip faces that are to be acted upon. The resilient restoring force is provided by cup spring packages 38, 39.

In the starting state of the device 31, the width of the gap between the rollers 11, 13 on the one side and the rollers 12, 14 on the other side is slightly smaller than the thickness of the supporting strip that is to be cleaned. Application of the device 31 to a supporting strip to be cleaned and drawing of the supporting strip into the gap between the rollers 11, 13; 12, 14 of the device 31 also rest against the longitudinal sides of the relevant supporting strips under bias. In addition to the rollers 11, 13; 12, 14, the device 31 has brush-like cleaning elements 40, 41 as cleaning members.

Referring to FIG. 5, the brush-like cleaning elements 40, 41 are mounted on the guide plates 16, 17 of the guide arrangement 18. Viewed in the direction of feed 28, they are behind the rollers 11, 13; 12, 14. They have tongue-like segments or furcates 42 with which they act under bias on the supporting strip to be cleaned on opposite longitudinal side faces. During the movement of the device 31 along the relevant supporting strip, the tongue-like segments 42 of the brush-like cleaning elements 40, 41 also penetrate into the gaps between the points 4 of the supporting strip and remove any contamination that may be present there.

In some embodiments, mechanical guidance of the devices 1, 31 is also possible. For that purpose, it is possible to use, for example, movement axes of the machining apparatus that is provided with the supporting strips 2 that are to be cleaned. On laser cutting machines, for example, the devices 1, 31 can be moved along contaminated supporting strips 2, using, for example, the movement axes of a laser cutting head.

Other implementations are within the scope of the following claims.

What is claimed is:

1. A device for cleaning supporting strips of workpiece supports for a machine for thermal cutting of workpieces, the device comprising:
   a motor feed drive assembly comprising
      a feed drive motor and
      a feed member, the feed member being configured to engage the supporting strip and to be driven by the feed drive motor to apply a feed force to provide relative motion between the feed member and the supporting strip along a longitudinal direction of the supporting strip, wherein at least a substantial proportion of the feed force applied by the feed member is generated not by an operator of the device, but by the feed drive motor and wherein the feed member forms a cleaning member configured to remove deposits that have formed on the supporting strip during a thermal workpiece cutting process.

2. The device according to claim 1, wherein at least one feed member is drivable about a rotation axis extending in a transverse direction.

3. The device according to claim 1, wherein at least one feed member rolls over the supporting strip in a driven state to produce feed motion.

4. The device according to claim 1, further comprising at least one opposite support associated with at least one feed member; the opposite support applied to the opposite side of the supporting strip from the side of the feed member and configured to guide at least one of the cleaning member and the supporting strip along the longitudinal direction during the feed motion.

5. The device according to claim 4, wherein at least one opposite support forms a cleaning member.

6. The device according to claim 5, wherein the at least one opposite support comprises at least one protrusion on a side toward the supporting strip.

7. The device according to claim 6, wherein the protrusion comprises a substantially vertical strip extending along a circumferential surface of the at least one opposite support.

8. The device according to claim 6, wherein the protrusion comprises a substantially helical strip extending along the at least one opposite support.

9. The device according to claim 1, further comprising a further feed member associated with at least one feed member to form the opposite support, the further feed member configured to be drivable by the feed drive motor in the opposite direction about a parallel rotation axis.

10. The device according to claim 1, wherein at least one cleaning member is configured to be biased toward that supporting strip when in operation on a supporting strip to be cleaned.

11. The device according to claim 1, wherein two feed members are associated with one and the same side of the supporting strip and are disposed one behind the other in the longitudinal direction of the latter and form cleaning members of differing construction on the portion thereof that can be applied to the supporting strip.

12. The device according to claim 1, wherein the feed member comprises at least one protrusion on a side toward the supporting strip.

13. The device according to claim 12, wherein the protrusion comprises a substantially vertical strip extending along a circumferential surface of the feed member.

14. The device according to claim 12, wherein the protrusion comprises a substantially helical strip extending along the feed member.

15. The device according to claim 1, wherein the motor feed drive assembly further comprises a safety clutch operably connected to the drive motor and a feed member.

16. The device according to claim 1, further comprising a brush adjacent the cleaning member and configured to engage the supporting strip.

17. The device according to claim 16, wherein the brush comprises a base and plurality of furcates extending therefrom, wherein the free ends of the furcates engage the supporting strip.

18. The device according to claim 1, further comprising:
   a base body; and
   a guide handle provided on each side of the base body in the longitudinal direction of the supporting strip.

19. The device according to claim 18, further comprising a guide arrangement and a guide handle provided on each side of the base body in the longitudinal direction of the supporting strip.

20. The device according to claim 19, further comprising a guide arrangement provided on the base body wherein the guide arrangement deflects during the feed motion relative to the supporting strip in the transverse direction of the supporting strip and along the longitudinal sides of the supporting strip.

\* \* \* \* \*